US009923907B2

(12) United States Patent
Bareket et al.

(10) Patent No.: US 9,923,907 B2
(45) Date of Patent: Mar. 20, 2018

(54) PUSH NOTIFICATIONS OF SYSTEM EVENTS IN A RESTRICTED NETWORK

(71) Applicant: INTERNATIONAL BUSINESS MACHINES CORPORATION, Armonk, NY (US)

(72) Inventors: Amit Bareket, Yavne (IL); Michael Keller, Haifa (IL); Daniel Lereya, Tel Aviv (IL); Avraham Sabzerou, Ganey Tikva (IL); Moshe Weiss, Petah Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 14/325,930

(22) Filed: Jul. 8, 2014

(65) Prior Publication Data
US 2016/0014143 A1    Jan. 14, 2016

(51) Int. Cl.
*H04L 29/00* (2006.01)
*H04L 29/06* (2006.01)

(52) U.S. Cl.
CPC .................. *H04L 63/1416* (2013.01)

(58) Field of Classification Search
CPC .................... G06F 7/04; G06F 17/30
USPC ............................................. 726/9
See application file for complete search history.

(56) References Cited

U.S. PATENT DOCUMENTS

| 8,407,776 B2 * | 3/2013 | Somani ............... H04L 63/0884 |
| | | 709/226 |
| 2011/0252079 A1 | 10/2011 | Werner et al. |
| 2011/0252145 A1 | 10/2011 | Lampell et al. |
| 2013/0110938 A1 | 5/2013 | Wener et al. |
| 2013/0268641 A1 | 10/2013 | Colbert et al. |

FOREIGN PATENT DOCUMENTS

WO    2013082501 A1    6/2013

OTHER PUBLICATIONS

Ben Bradley/ Network Scanners Detect USB Security Threat/ May 12, 2006/ Beyond-IP,LLC/pp. 1-2.*

(Continued)

*Primary Examiner* — Brandon Hoffman
*Assistant Examiner* — Michael D Anderson
(74) *Attorney, Agent, or Firm* — Griffiths & Seaton PLLC (57) ABSTRACT

Methods, computing systems and computer program products implement embodiments of the present invention that include associating a token with a computing device, defining preferences for the computing device, and conveying, by the computing device, the token and the preferences to an event processing system. Upon the event processing system, an event message from a computing system via a one-way firewall and matching the computing device preferences to the event message, the event processing system can convey the token and the event message to a push notification system. In some embodiments, upon the push notification service receiving the token and the event message, the mobile device can be identified based on the token, and the event message can be conveyed to the computing device. The event messages may include a severity level, and the preferences may include a severity threshold and a message detail level.

20 Claims, 5 Drawing Sheets

(56) References Cited

OTHER PUBLICATIONS

Garcia-Martin, A Session Initiation Protocol (SIP) Event Package and Data Format for Various Settings in Support for the Push-to-Talk over Cellular (PoC) Service R, Jan. 1, 2006, IP.com.
Smailovic et al., Bfriend: Context-Aware Ad-Hoc Social Networking for Mobile Userspp. 612-617, May 2012, MIPRO 2012.
Vihavainen et al., The Implications of Mobile Notifications for User Experience of a Social Network Service vol. 7, Issue 2, Apr. 2013, iJIM.
Yegin et al., "Protocol for Carrying Authentication for Network Access (PANA) Requirements (RFC4058)", May 1, 2005, IP.com.

* cited by examiner

PUSH NOTIFICATIONS OF SYSTEM EVENTS IN A RESTRICTED NETWORK

FIELD OF THE INVENTION

The present invention relates generally to error reporting, and specifically to providing a method for online mobile push notifications of network element alerts in a restricted network.

BACKGROUND

Devices such as storage devices, cable video routers and switches that communicate via a private network (also known as a restricted network) are typically continually monitored in order to prevent attacks such as denial-of-service (DOS) attacks and to prevent exposure of critical and/or confidential data. While private networks typically do not have an inbound transport layer, they may have an outbound transport layer configured to convey device status and event notifications, thereby enabling the devices can be monitored by an external monitoring device.

The description above is presented as a general overview of related art in this field and should not be construed as an admission that any of the information it contains constitutes prior art against the present patent application.

SUMMARY

There is provided, in accordance with an embodiment of the present invention a method, including associating a token with a computing device, defining preferences for the computing device, conveying, by the computing device, the token and the preferences to an event processing system, receiving, by the event processing system, an event message from a computing system via a one-way firewall, and upon matching the computing device preferences to the event message, conveying, by the event processing system, the token and the event message to a push notification system.

There is also provided, in accordance with an embodiment of the present invention a computing facility, including a computing device, a push notification system configured to associate a token with the computing device, and to define preferences for the computing device, a computing system, a one-way firewall, and an event processing system configured to receive the token and the preferences from the computing device, to receive an event message from the computing system via the one-way firewall, and upon matching the computing device preferences to the event message, to convey the token and the event message to the push notification system.

There is further provided, in accordance with an embodiment of the present invention a computer program product, the computer program product including a non-transitory computer readable storage medium having computer readable program code embodied therewith, the computer readable program code including computer readable program code configured to associate a token with a computing device, computer readable program code configured to define preferences for the computing device, computer readable program code configured to convey the token and the preferences from the computing device to an event processing system, computer readable program code configured to receive, by the event processing system, an event message from a computing system via a one-way firewall, and computer readable program code configured, upon matching the computing device preferences to the event message, to convey the token and the event message from the event processing system to a push notification system.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for one or more computer systems in a restricted network to push notifications of system events to a computing device that that is outside the restricted network. As explained hereinbelow, the computing device may be configured to monitor the computer systems by communicating with the first devices via unidirectional network connections.

In some embodiments, a facility comprising the restricted network and the computing device (typically a mobile device such as a smartphone or a tablet computer) can be initialized by associating a token with the computing device, defining one or more preferences for the computing device, and conveying the token and one or more preferences to an event processing system that is in communication with the computer system(s) in the restricted network via a one-way firewall. As explained hereinbelow, the token may comprise a unique identifier for the computing device, and the preferences may comprise an event severity threshold.

Upon a given computer system in the restricted network detecting an event, the given computer system can convey an event message to the event processing system via the one-way firewall, and upon matching the preferences to the event message, the event processing system can convey the token and the event message to a push notification service, which uses the token to identify a given computing device, and then conveys the event message to the identified computing device.

Figure 1:
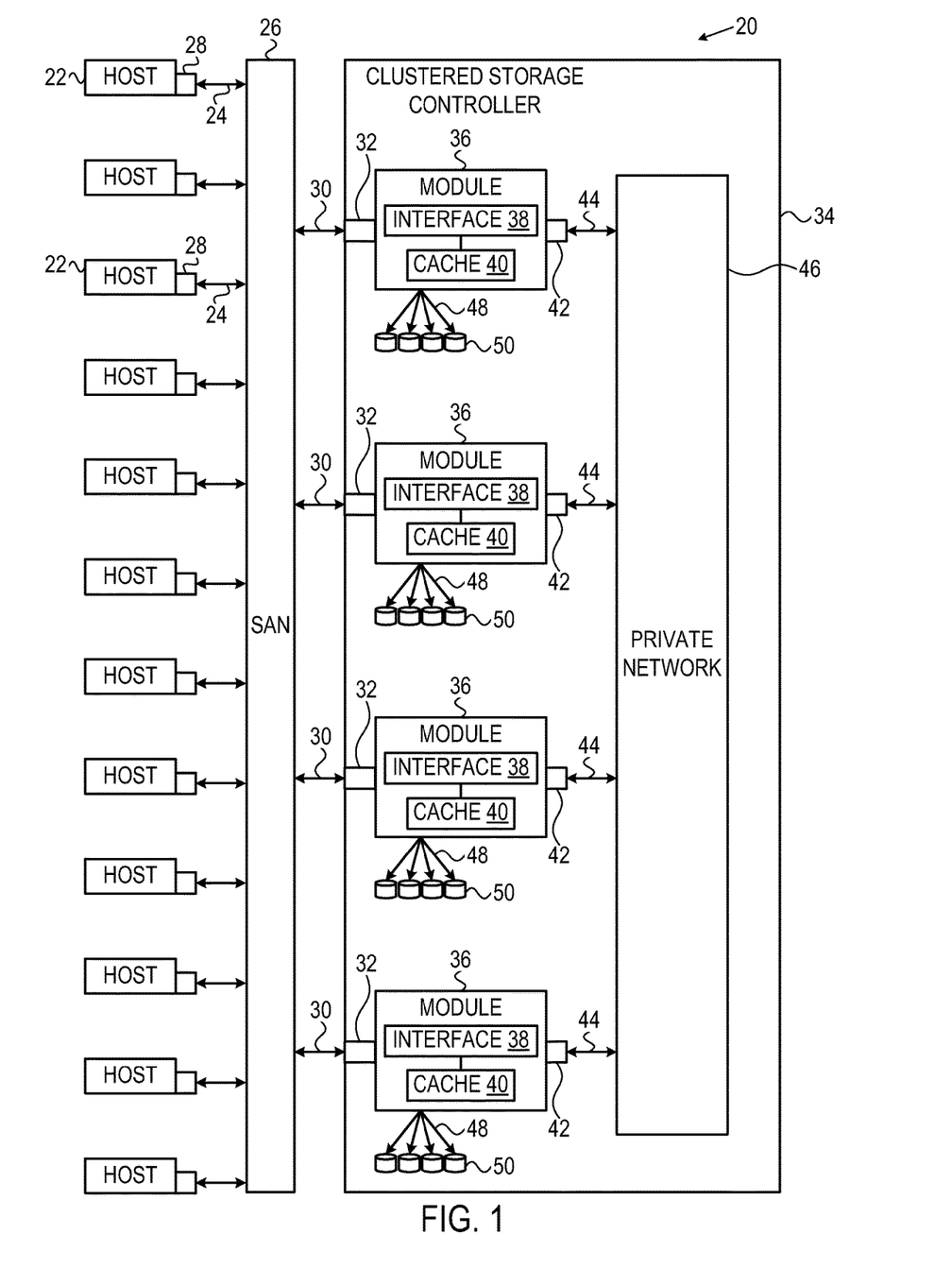
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
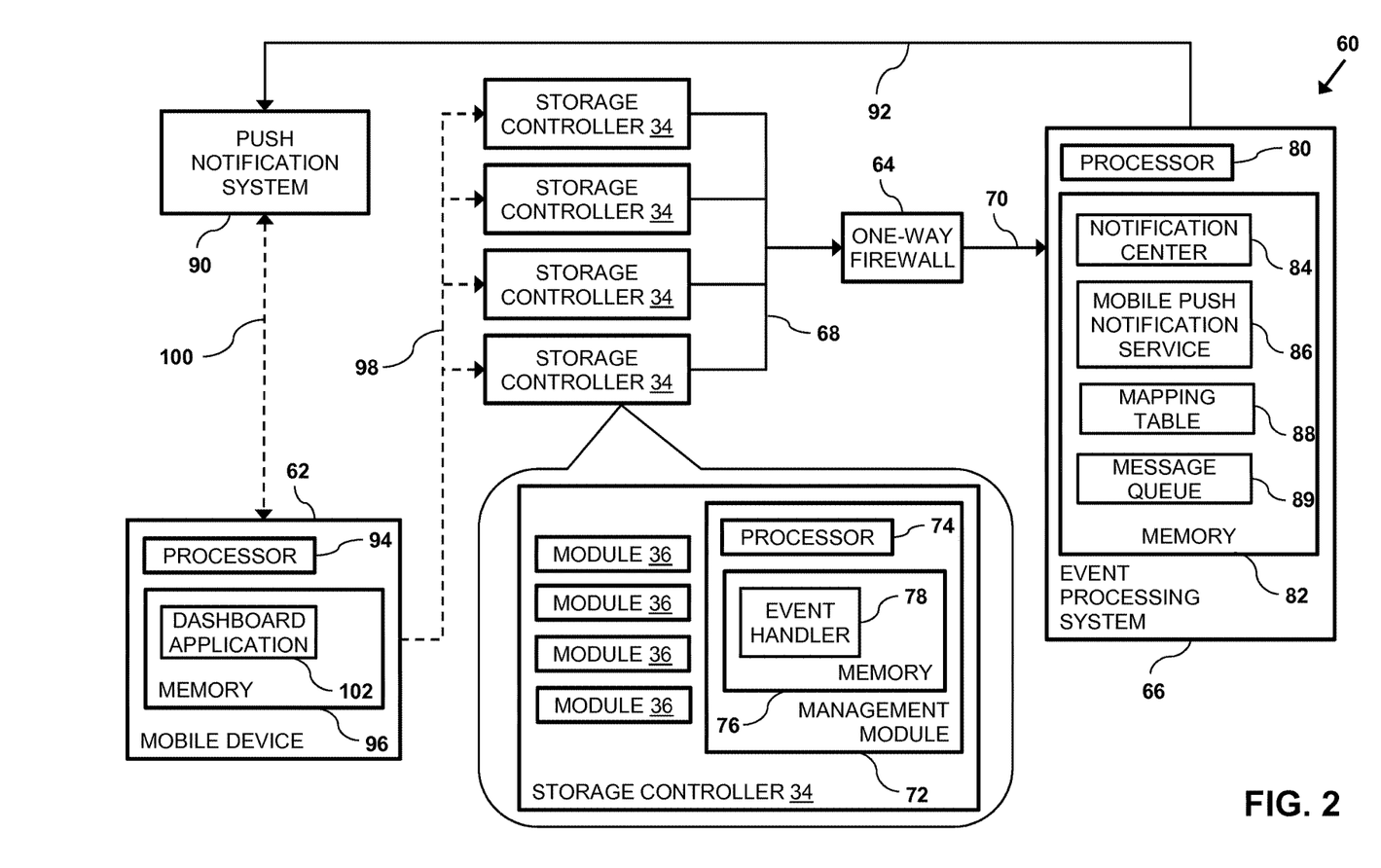
FIG. 2 is a block diagram that schematically illustrates a first computing facility configured to convey push notifications of system events from multiple storage systems, in accordance with an embodiment of the present invention.

FIG. 2 is a block diagram that schematically illustrates a computing facility 60 configured to convey push notifications of system events from multiple storage controllers 34 to a mobile device 62, in accordance with an embodiment of the present invention. In embodiments described herein, a given storage controller 34 may also be referred to as a computer system, and mobile device 62 may also referred to herein as a computing device. Additionally, while the configuration in FIG. 2 shows facility 60 comprising a restricted network of storage controllers 34, a restricted network connecting any type (or types) of computer systems and network devices is considered to be within the spirit and scope of the present invention.

In addition to storage controllers 34, facility 60 comprises a one-way firewall 64 that is configured to enable the storage controllers to convey event messages (e.g., emails) to an event processing system 66. In the configuration shown in FIG. 2, storage controllers 34 and event processing system 66 are coupled to one-way firewall 64 via wired connections 68 and 70.

While the configuration shown in FIG. 2 comprises a single mobile device 62 configured to receive push notifications of system events (i.e., via event messages), a facility comprising multiple devices 62 configured to receive the push notifications is considered to be within the spirits and scope of the present invention. In embodiments of the present invention, each event message may have a severity level, and each mobile device 62 can be assigned a severity threshold, as explained hereinbelow. Examples of severity levels for specific system events include, but are not limited to, informational events, warning events, minor events, major events and critical events.

In addition to modules 36, each storage controller 34 comprises a management module 72 that manages modules 36. Although not explicitly shown in FIG. 2 for purposes of illustrative simplicity, management module 72 can communicate with modules 36 via private network 46. Management module 72 comprises a management processor 74 and a management memory 76.

In operation, processor 74 executes, from memory 76, an event handler 78 that is configured to detect an event in the storage controller, and to convey an event message to event processing system 66 in response to detecting the event. Examples of event messages and their corresponding events and severity levels include, but are not limited to:

USER_LOGIN_HAS_SUCCEEDED. This event message indicates that a user xiv_msms has successfully logged into the system from IP 9.151.133.204. This is an example of an informational event.

USER_HAS_FAILED_TO_RUN_COMMAND. This event message indicates that a user admin from IP 9.151.133.225 failed authentication when trying to run command version_get. This is an example of a warning event.

EVENTS_WERE_SUPPRESSED. This event message indicates that 111 "HOST_NO_MULTIPATH_ONLY_ONE_PORT" events of maximal severity warning were suppressed in the last 60 minutes. This is an example of a minor event.

STORAGE_POOL_VOLUME_USAGE_INCREASED. This event message indicates that usage by volumes of a storage pool named lol_0 has reached 100%. This is an example of a major event.

EMERGENCY_SHUTDOWN_NOW. This event message indicates that a system is shutting down in emergency shutdown mode due to no external power. This is an example of a critical event.

In some embodiments the event message and parameters describing the event may be combined to form an event payload. For example a payload for the informational event described supra may comprise the event message, the user name and the IP address.

Event processing system 66 comprises an event processor 80 and an event memory 82 that stores a notification center application 84, a mobile push notification service 86, a mapping table 88, and a message queue 89. As explained hereinbelow, each given device 62 is assigned a token (i.e., a unique identifier) and preferences that include a severity level. In operation, notification center 84 is configured to receive an event message from a given storage controller 34, and store the received event message to the message queue. Mapping table 88 is configured to store a token and preferences for each device 62. The preferences comprise information such as a severity level and a message detail level (e.g., short summary messages or long detailed messages).

Mobile push notification service 86 is configured to "poll" message queue 89 for new event messages, and upon detecting a new event message the mobile push notification service identifies one or more devices 62 whose preferences matches the detected event message, and conveys a respective token and the event message for each of the identified mobile devices to a push notification system 90 via network connection 92. Network connection 92 may comprise a local area network connection, a wide area network connection or an Internet connection.

As described supra, each event message has an associated severity level, and each device 62 has a severity threshold. In some embodiments, mobile push notification service 86 can identify a given device 62 whose preferences match the detected event message by identifying a given device 62 whose severity threshold (i.e., in its preferences) is less than or equal to the severity level associated with the detected event message.

Mobile device 62 comprises a mobile processor 94 and a mobile memory 96. In the configuration shown in FIG. 2, mobile device 62 is configured to communicate with storage controllers 34 via a wireless connection 98 and to communicate with push notification system 90 via a wireless connection 100. In operation processor 94 executes a dashboard application 102 that is configured to receive an event message from facility 60 using embodiments described herein, and to present the event message to a user (not shown) on the mobile device's display (not shown).

Push notification system 90 comprises a service that is configured to register mobile devices 62 with facility 60 and to push event messages to the mobile devices. Examples of push notification system 90 include, but are not limited to, Apple Push Notification Service™ (APNs™) produced by Apple Inc., of Cupertino, Calif., and Google Cloud Messaging™ (GCM™) produced by Google Inc., Mountain View, Calif.

To register a given mobile device 62, push notification system 90 generates a token comprising a unique identifier, and conveys the token to the given mobile device via connection 100. In operation, upon receiving a token and an event message, push notification system 90 identifies a given mobile device 62 that is associated with the received token, and conveys (i.e., "pushes") the event message to the identified mobile device via connection 100.

In the configuration shown in FIG. 2, facility 60 comprises a restricted network having both unidirectional and bidirectional network connections. Network connection 68 comprises a unidirectional network connection configured to convey data from storage controllers 34 to one-way firewall 64. Network connection 70 comprises a unidirectional network connection configured to convey data from on-way firewall 64 to event processing system 66. Network connection 92 comprises a unidirectional network connection configured to convey data from event processing system 66 to push notification system 90. Network connection 98 comprises a unidirectional network connection configured to convey data from mobile device 62 to storage controllers 34. Network connection 100 comprises a bidirectional network connection configured to convey data between mobile device 62 and push notification system 90. Additionally, one-way firewall is configured to forward data from storage controllers 34 to event processing system 66, thereby protecting facility 60 from any unauthorized access to the storage controllers.

In the configuration shown in FIG. 2, mobile device 62 cannot communicate directly with event processing system 66. To convey a first message (e.g., a token and preferences) to event processing system 66, mobile device conveys the first message to a given storage controller 34 via connection 98, and the given storage conveys the first message to the event processing system via connection 68, one-way firewall 64 and connection 70. Likewise, event processing system 66 can convey a second message (e.g., an event message received from a given storage controller 34 via connection 68, one-way firewall 64 and connection 70) to mobile device 62 by conveying the second message to push notification system 90 via connection 92, and upon receiving the second message, the push notification system conveys (i.e., "pushes") the second message to the mobile device via connection 100.

Processors 74, 80 and 94 as well as additional processors (not shown) in firewall 64 and push notification system 90 may comprise general-purpose central processing units (CPU) or special-purpose embedded processors, which are programmed in software or firmware to carry out the functions described herein. The software may be downloaded to modules 72, firewall 64, event processing system 66, push notification system 90 and mobile device(s) 62 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Event Notification

Figure 3:
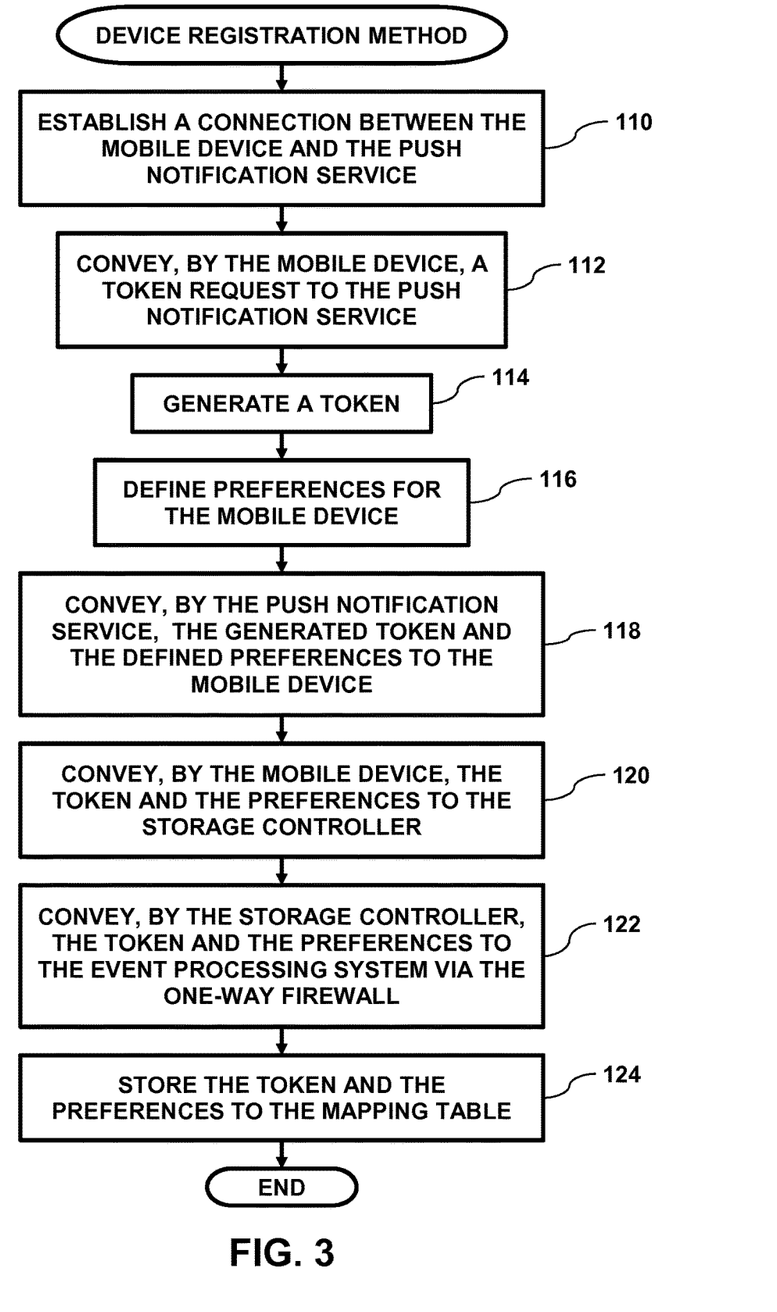
FIG. 3 is a flow diagram that schematically illustrates a method of registering a mobile computing device with the facility, in accordance an embodiment of the present invention.

FIG. 3 is a flow diagram that schematically illustrates a method of registering a given mobile computing device 62 with facility 60, in accordance an embodiment of the present invention. In a connection step 110, a user (not shown) installs dashboard application 102 on mobile device 62, and the mobile device establishes connection 100 with push notification system 90.

Subsequent to establishing connection 100, processor 94 conveys, via connection 100, a token request to push notification system 90 in a request step 112, and the push notification generates a unique token responsively to the request in a generate step 114. In addition to generating the token, push notification system 90 can define preferences for the device in a definition step 116. For example, push notification system 90 can set a severity threshold based on an identity of a user associated with the mobile device. In some embodiments, the user can enter the preferences via the mobile device. In additional embodiments, a system administrator (not shown) can enter the preferences via a console (not shown) coupled to a given storage controller 34.

In a first convey step 118 push notification system 90 conveys the generated token and the defined preferences to mobile device 62 via connection 100, and upon receiving the token and the preferences from the push notification service, processor 94 conveys the token and the preferences to a given storage controller 34 via connection 98 in a second convey step 120. Upon receiving the token and the preferences from mobile device 63, in a third convey step 122, processor 74 in the given storage controller conveys the token and the preferences to event processing system 66 via one-way firewall 64. Finally, in a store step 124, upon receiving the token and the preferences, processor 80 stores the token and the preferences to an entry in mapping table 88, and the method ends.

Figure 4:
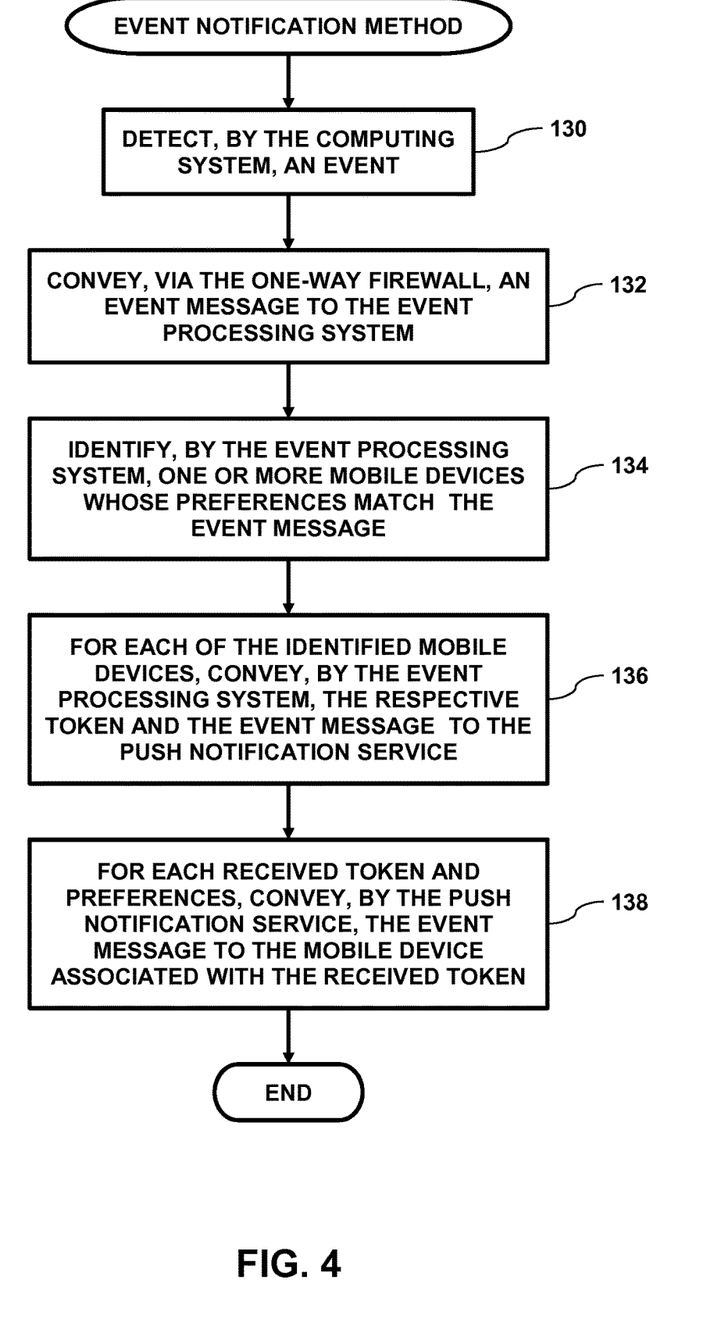
FIG. 4 is a flow diagram that schematically illustrates a method of generating push messages for the mobile computing device in response to a system event, in accordance an embodiment of the present invention.

FIG. 4 is a flow diagram that schematically illustrates a method of generating push messages for mobile computing device 62 in response to an event in a given storage controller 34, in accordance an embodiment of the present invention. In a detection step 130, processor 74 in a given storage controller 34 detects an event such as a user login (other types of events are described supra).

In a convey step 132, processor 74 conveys an event message to event processing system 66 via one-way firewall 64. In some embodiments, the event message may include an identity of the storage controller whose management module 72 conveyed the request.

Upon notification center 84 receiving the event message, the notification center stores the received event message to message queue 89. In operation, mobile push notification service 86 is configured to periodically poll message queue 89, and upon detecting an unsent event message in the message queue, the mobile push notification service identifies, in an identification step 134, one or more mobile devices 62 whose respective preferences match the received event message. To identify a given mobile device 62, mobile push notification service 86 locates an entry in mapping table 88 for the given mobile device whose respective severity threshold is less than or equal to the severity level of the detected event message in message queue 89.

In a convey step 136, processor 80 conveys, to push notification system 90, the event message and the respective token for each of the identified mobile devices 62. Finally, in a push step 138, for each token and preferences received by push notification system 90, the push notification service identifies, based on the token, a given mobile device 62, conveys the event message to the identified mobile device 62, and the method ends.

Figure 5:
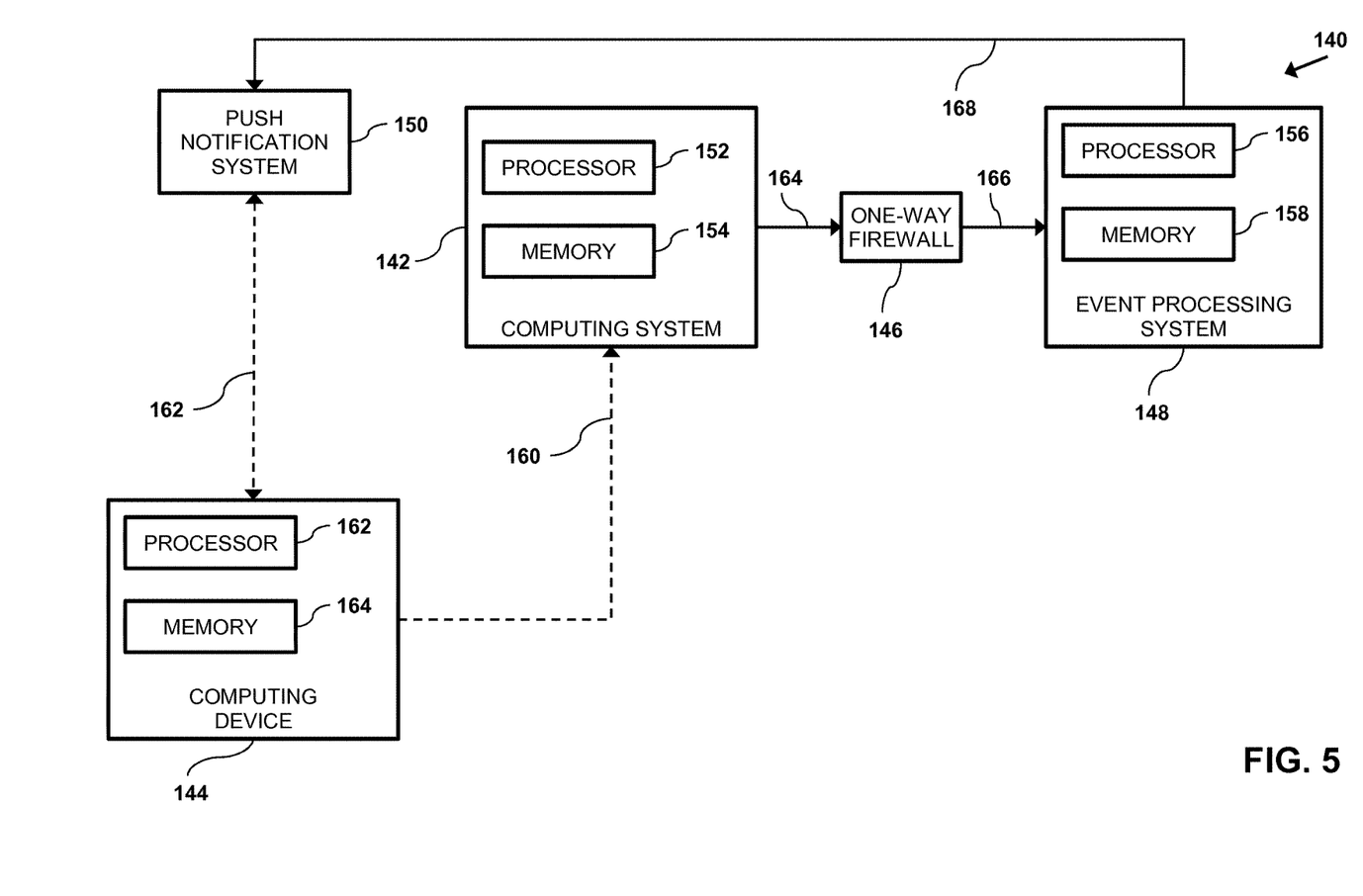
FIG. 5 is a block diagram that schematically illustrates a second computing facility configured to convey push notifications of system events from a computer, in accordance with an alternative embodiment of the present invention.

FIG. 5 is a block diagram that schematically illustrates a computing facility 140 configured to convey push notifications of system events from a computing system 142 to a computing device 144 (also referred to herein as a monitoring device), in accordance with an alternative embodiment of the present invention. Elements of facility 140 can be used to implement embodiments of the present invention as described in FIGS. 3 and 4 hereinabove.

In addition to computing system 142 and monitoring device 144, computing facility 140 comprises a one-way firewall 146, an event processing system 148, and a push notification system 150. Computing system 142 comprises a processor 152 and a memory 154, and event processing system 148 comprises a processor 156 and a memory 158. In operation, processor 152 and memory 154 are configured to carry out the functions performed by processor 74 and memory 76, processor 156 and memory 158 are configured to carry out the functions performed by processor 94 and memory 96, one-way firewall 146 is configured to carry out the functions performed by one-way firewall 64, event processing system 148 is configured to carry out the functions performed by event processing system 66, and push notification system 150 is configured to carry out the functions performed by push notification system 90, as described hereinabove.

In the configuration shown in FIG. 5, monitoring device 66 conveys messages to computing system 142 via a unidirectional wireless network connection 160, the monitoring device communicates with (i.e., sends messages to, and receives messages from) push notification system 150 via a bidirectional wireless network connection 162, computing system 142 conveys messages to one-way firewall 146 via a unidirectional wired network connection 164, the one-way firewall conveys messages to event processing system 148 via a unidirectional wired network connection 166, and the event processing system conveys messages to push notification system 150 via a unidirectional wired network connection 168.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    associating a token with a mobile computing device, the token comprising a unique identifier assigned to the mobile computing device;
    defining preferences of event information to be received in an event message by the mobile computing device, the event information corresponding to a detected event within a storage controller of a mass data storage system, wherein the storage controller comprises a distinct computing entity within the mass data storage system distributing input/output (I/O) data transferred to and from a plurality of host computers via a storage area network (SAN) and the detected event is related to an operational status of the mass data storage system;
    conveying, by the mobile computing device, the token and the preferences to an event processing system;
    upon detecting the event by the storage controller:
        receiving, by the event processing system, the event message containing the event information from the storage controller via a one-way firewall; and
        matching the mobile computing device preferences to the event message and conveying, by the event processing system, the token and the event message containing the event information to a push notification system.

2. The method according to claim 1, and comprising upon receiving, by the push notification service, the token and the event message:
    identifying, based on the token, the mobile computing device, and
    conveying the event message to the mobile computing device.

3. The method according to claim 1, wherein associating the token comprises conveying, by the mobile computing device, a token request, generating, by the push notification service, the token in response to the request, and conveying, by the push notification service, the token to the mobile computing device.

4. The method according to claim 1, wherein conveying the token and the preferences comprises conveying, from the mobile computing device, the token and the preferences to the storage controller, and conveying, from the storage controller, the token and the preferences to the event processing system via the one-way firewall.

5. The method according to claim 1, wherein the event message comprises a severity level that is selected a list consisting of an informational event, a warning event, a minor event, a major event and a critical event.

6. The method according to claim 5, wherein the preferences comprise a severity threshold and a message detail level.

7. The method according to claim 6, wherein matching the preference to the event message comprises detecting that severity threshold is less than or equal to the severity level.

8. A facility, comprising:
    a mobile computing device;
    a storage controller of a mass data storage system, the storage controller comprising a distinct computing entity within the mass data storage system distributing input/output (I/O) data transferred to and from a plurality of host computers via a storage area network (SAN) and;
    a push notification system configured to associate a token with the mobile computing device, and to define preferences of event information to be received in an event message by the mobile computing device, the token comprising a unique identifier assigned to the mobile computing device and the event information corresponding to a detected event within the storage controller of the mass data storage system, wherein the detected event is related to an operational status of the mass data storage system;
    a one-way firewall; and
    an event processing system configured to receive the token and the preferences from the mobile computing device and to, upon detecting the event by the storage controller:
        receive the event message containing the event information from the storage controller via the one-way firewall, and match the mobile computing device preferences to the event message and convey the token and the event message containing the event information to the push notification system.

9. The facility according to claim 8, wherein the push notification service is configured, upon receiving the token and the event message:
    to identify, based on the token, the mobile computing device, and
    to convey the event message to the mobile computing device.

10. The facility according to claim 8, wherein the push notification service is configured to associate the token by receiving, from the mobile computing device, a token request, generating the token in response to the request, and conveying the token to the mobile computing device.

11. The facility according to claim 8, wherein conveying the token and the preferences comprises conveying, from the mobile computing device, the token and the preferences to the storage controller, and conveying, from the storage controller, the token and the preferences to the event processing system via the one-way firewall.

12. The facility according to claim 8, wherein the event message comprises a severity level that is selected a list consisting of an informational event, a warning event, a minor event, a major event and a critical event.

13. The facility according to claim 12, wherein the preferences comprise a severity threshold and a message detail level.

14. The facility according to claim 13, wherein the event processing system is configured to match the preference to the event message by detecting that severity threshold is less than or equal to the severity level.

15. A computer program product, the computer program product comprising:
- a non-transitory computer readable storage medium having computer readable program code embodied therewith, the computer readable program code comprising:
- computer readable program code configured to associate a token with a mobile computing device, the token comprising a unique identifier assigned to the mobile computing device;
- computer readable program code configured to define preferences of event information to be received in an event message by the mobile computing device, the event information corresponding to a detected event within a storage controller of a mass data storage system, wherein the storage controller comprises a distinct computing entity within the mass data storage system distributing input/output (I/O) data transferred to and from a plurality of host computers via a storage area network (SAN) and the detected event is related to an operational status of the mass data storage system;
- computer readable program code configured to convey the token and the preferences from the mobile computing device to an event processing system;
- computer readable program code configured to, upon detecting the event by the storage controller:
  - receive, by the event processing system, the event message containing the event information from the storage controller via a one-way firewall; and
  - match the mobile computing device preferences to the event message and convey the token and the event message containing the event information from the event processing system to a push notification system.

16. The computer program product according to claim 15, and comprising upon receiving, by the push notification service, the token and the event message:
- computer readable program code configured to identify, based on the token, the mobile computing device, and computer readable program code configured to convey the event message to the mobile computing device.

17. The computer program product according to claim 15, wherein the computer readable program code is configured to associate the token by conveying, by the mobile computing device, a token request, generating, by the push notification service, the token in response to the request, and conveying, by the push notification service, the token to the mobile computing device.

18. The computer program product according to claim 15, wherein the computer readable program code is configured to convey the token and the preferences by conveying, from the mobile computing device, the token and the preferences to the storage controller, and conveying, from the storage controller, the token and the preferences to the event processing system via the one-way firewall.

19. The computer program product according to claim 15, wherein the event message comprises a severity level that is selected a list consisting of an informational event, a warning event, a minor event, a major event and a critical event, and wherein the preferences comprise a severity threshold and a message detail level.

20. The computer program product according to claim 19, wherein the computer readable program code is configured to match the preference to the event message by detecting that severity threshold is less than or equal to the severity level.

* * * * *